United States Patent [19]

Berven et al.

[11] Patent Number: 4,816,191
[45] Date of Patent: Mar. 28, 1989

[54] DISTRIBUTOR FOR LIQUID-GAS CONTACT COLUMN AND METHOD OF PREPARATION AND USE

[75] Inventors: O. Jeffrey Berven; James M. Meyer, both of Wichita, Kans.

[73] Assignee: Koch Engineering Company, Inc., Wichita, Kans.

[21] Appl. No.: 145,625

[22] Filed: Jan. 19, 1988

[51] Int. Cl.$^4$ .............................................. B01F 3/04
[52] U.S. Cl. ...................................................... 261/97
[58] Field of Search ................................... 261/97, 110

[56] References Cited

U.S. PATENT DOCUMENTS

| | | | |
|---|---|---|---|
| 3,360,246 | 12/1967 | Eckert | 261/97 |
| 3,491,792 | 1/1970 | Eckert | 137/97 |
| 3,937,769 | 2/1976 | Strigle, Jr. et al. | 261/97 |
| 4,264,538 | 4/1981 | Moore et al. | 261/97 |
| 4,476,069 | 10/1984 | Harper et al. | 261/97 |
| 4,479,909 | 10/1984 | Streuber | 261/97 |
| 4,648,972 | 3/1987 | Ullrich et al. | 210/97 |
| 4,729,857 | 3/1988 | Lee et al. | 261/97 |

FOREIGN PATENT DOCUMENTS

| | | | |
|---|---|---|---|
| 3013782 | 10/1981 | Fed. Rep. of Germany | 261/97 |
| 2752391 | 6/1985 | Fed. Rep. of Germany | 261/97 |
| 3409524 | 9/1985 | Fed. Rep. of Germany | 261/97 |
| 2945103 | 11/1985 | Fed. Rep. of Germany | 261/97 |

*Primary Examiner*—Tim Miles
*Attorney, Agent, or Firm*—Richard P. Crowley

[57] ABSTRACT

A liquid distributor for a gas-liquid contact column, which liquid distributor comprises a plurality of elongated distributors extending across the general cross section of a gas-liquid contact column, and secondary distributing troughs located on each side of the distributor, the secondary distributor troughs containing a deflection plate having an upper section and a lower section and a support plate which connects the deflection plate and spaces the deflection plate apart from the liquid distributor, the support plate having large openings for the upward passage of a gas and smaller openings located near the intersection of the support plate with the deflection plate to permit the liquid splashing from the orifices of the liquid distributor against the deflection plate to flow downwardly against the wall surface of the lower portion of the deflection plate and to be distributed through multiple drip points on the lower edge of the deflection plate in the lower portion of the gas-liquid column.

12 Claims, 3 Drawing Sheets

DISTRIBUTOR FOR LIQUID-GAS CONTACT COLUMN AND METHOD OF PREPARATION AND USE

BACKGROUND OF THE INVENTION

Mass transfer columns, such as liquid vapor contact columns, are employed, for example, in distillation, absorption and stripping and typically provide for a liquid distributing means at the upper end of the column to distribute a liquid. The liquid is to be introduced at the upper section of the column more or less uniformly over the entire cross sectional area of the column before the liquid comes into an exchange relationship with an upwardly flowing gas. Generally the columns contain one or more, for example, a plurality of, gas-liquid contacting zones which comprise packing-type material, either a random or a structured-type packing material or a combination thereof, positioned in the column to effect the efficient contact between the upwardly flowing gas and the downwardly flowing liquid.

Generally, liquid distributors comprise a trough-like arrangement or pipes generally arranged in a parallel relationship across the cross section of the column and containing therein overflow channels at a defined level for the liquid to overflow the pipe or trough and to be distributed generally uniformly over the cross section of the column. In particular, a liquid distributor means may employ a central parting box as a predistributor means which generally extends perpendicularly to the parallel arranged troughs and into which parting box a liquid is fed from a pipe and from which predistributing means liquid is fed to the distributors for uniform distribution throughout the column. It is known that good liquid distribution is essential to obtain the proper performance for gas-liquid contact in a packed column. The proper liquid drip point distribution and maintaining such drip point distribution has been the subject of numerous publications and patents. It is particularly important to obtain good liquid distribution to prevent fouling at low liquid distribution rates, which is difficult since the holes used for liquid distribution are small in diameter and may tend to plug in use. It is therefore desirable to provide for an improved, efficient liquid distribution in a gas-liquid contact column so as to provide better distribution to the underlying packing in the gas-liquid column and to provide an open structure which facilitates cleaning of the multiple point drip structure and the flow orifices.

U.S. Pat. No. 3,491,792 discloses a vapor liquid distributing column which employs a plurality of generally parallel troughs and a central meter box to distribute a liquid to the packing below, the troughs having an upper portion of a gradient width and a lower portion of substantially constant width. German patent DE No. 27 52 391 C2 concerns a trough-type liquid distributor with a plate spaced apart from the side of the liquid distributor, the plate having multiple drip points at the lower end thereof and a material between the plate and the outside of the trough to provide improved distribution of the liquid. German patent DE No. 29 45 103 C2 relates to a trough-type liquid distributor with slotted openings in the side and containing a plurality of outwardly extending fingers to serve as drip points for the distribution of the liquid into the lower packing. German patent DE No. 30 13 782 A1 describes a trough-type liquid distributor with extending and bent fingers at the lower level thereof to provide for efficient distribution of the liquid issuing from the side orifices of the trough.

Other patents include U.S. Pat. No. 4,264,538 which describes an overflow liquid distributor for a packed column and which discloses a lower serrated portion extending downwardly from the trough and composing a number of angularly disposed drip portions and edges to direct the liquid flow over a uniform cross section area of the contact tower. U.S. Pat. No. 4,479,909 is directed to a distributor which includes a plurality of tubes having openings spaced apart on the upper sides of the distributor leading to respective troughs. The liquid is spread from the troughs by capillary channels which carry the liquid through slits in the wall of the trough onto various protruding tongues spread out below the tube to effect efficient distribution of the liquid from the troughs across the cross section area of the column. U.S. Pat. No. 4,476,069 relates to a liquid distributing apparatus which employs orifices in the side of a liquid distributing trough with the orifice being sized such that they stay submerged which includes adjacent vertical drip rods for the downwardly flowing liquid to provide good distribution of the liquid at low flow rates across the cross sectional area of the column. U.S. Pat. No. 4,648,972 concerns a liquid distributor wherein the high walls of the parting box or predistribution means are covered with a wettable, open pore material so as to provide improved and even distribution of liquid feed in the vapor-liquid contact tower.

Thus, the prior art has provided a number of this type of liquid distributors for gas-liquid contact towers and includes distributors having tongues or extensions or drip points below the trough or liquid distributing means. It is desirable however to provide for an improved liquid distributor for gas-liquid contact towers wherein there is improved efficiency in distribution of the liquid across the cross sectional area of the column and which distributor avoids some of the disadvantages and difficulties associated with manufacture and use of prior liquid distributors in gas-liquid contact columns.

SUMMARY OF THE INVENTION

The invention relates to an improved, packed, gas-liquid column and to a liquid distributor for use in such gas-liquid contact column and to the method of manufacturing such liquid distributor and its use in said column. More particularly, the invention concerns an improved liquid distributor for a gas-liquid contact column, which liquid distributor includes a one or more secondary distributing trough adjacent the center distribution trough. The secondary distributing trough includes a liquid deflection or impingement plate, which plate includes on its lower level a plurality of serrated-type edges to provide for multiple point distribution of the liquid onto the lower packing in the gas-liquid contact column and which includes means for the downward flow of liquid on the plate surface and for the upward flow of vapor through the trough.

A liquid distributor apparatus for use in gas-liquid contact columns or towers functions to distribute uniformly a downwardly flowing liquid generally uniformly across the cross section area of the contact tower and to permit the passage of an upwardly flowing vapor. The apparatus comprises a source of liquid, a means, such as a pipe, to distribute liquid into a liquid predistributing means, such as a meter or parting box, and a liquid distributor means, such as, for example, a plurality of spaced apart, generally parallel troughs or pipes with orifices therein to permit a downwardly flowing liquid from the predistributing means to pass into the liquid distributing means and a secondary trough means adjacent one or typically both sides of the distributor means. The secondary trough comprises a deflection or impingement plate means, having an upper and a lower section and generally spaced apart from and parallel to the sidewall of the liquid distributor means and having a bottom plate secured to the liquid distributor means and dividing the deflection or impingement means into an upper and lower section to provide an impingement or deflection surface at the upper level for the liquid issuing from the orifices in the sidewall of the distribution means.

The upper deflection plate section serves as a deflector or impinging plate for the liquid issuing from the orifices of the distributing means, the bottom plate being secured generally perpendicular or at an acute angle from and with the sidewall of the distribution means and characterized by a plurality of first openings generally adjacent the intersection of the deflection plate and the bottom plate to permit the downward flow of deflected or impinged liquid from said side orifices of the liquid distribution means. The first openings may vary in size and number and may be placed in the lower wall portion of the upper plate or the bottom plate or both. The bottom plate includes a plurality of second openings in the bottom plate and usually generally adjacent the other end of the bottom plate and larger than the first openings of the other end to permit the upward flow of gas through the bottom plate openings. The lower plate section generally extends below the lower surface of the distributor means and has a plurality of generally serrated drip points along the lower edge thereof or extending tongues or fingers whereby the lower plate section receives the downwardly flowing liquid on the lower plate wall surface from the first openings, and the liquid spreads over the plate surface and is distributed generally uniformly from said drip points to the said lower section in the gas-liquid contact tower.

The liquid distributor apparatus provides for the proper and efficient distribution of the liquid from the liquid distributor means and permits easy maintenance of such liquid distributor means and also provides good distribution at low liquid rates and while permitting the upward flow of gas without excessive pressure drops. The liquid distributor apparatus is an improvement of the trough-meter box-drip tube-distributor by employing a drip-through for each orifice in the lateral of the trough-type or wall-type liquid distributor. Drip tubes are replaced with a serrated plate generally shaped in the cross section of a "T" or a check mark (where the bottom plate angle is acute) and comprising an upper section and lower section with the drip points on the bottom plate providing the upper section.

In operation, the liquid stream from the side orifices of the liquid distributor flows to or splashes against the wall surface of the upper section of the impingement or deflection plate. The liquid then runs through the openings in the bottom section of the upper section or in the bottom plate and is distributed across the inner or outer surface of the lower plate and to a serrated or drip point area on the bottom plate which permits multiple drip points so that the liquid is distributed generally uniformly across the column.

The liquid distributor apparatus provides for more than a single drip point for each orifice or opening in the liquid distributor and so provides better distribution of the liquid to the underlying packing material. In addition, the liquid distributor has an open-type structure which facilitates cleaning of the structure and the flow orifices on both sides. The liquid distributor has large holes in the bottom or support plate which permits the gas or vapor to flow upwardly without significantly disturbing the liquid stream which is to be distributed from the multiple drip points in the lower plate section. The impingement or deflection plate permits the momentum of the liquid stream issuing from the side orifices of the distributor means to spread the liquid over the plate wall surface.

The size and shape of the holes in the bottom of the support plate may vary and typically and preferably the vapor holes are spaced on a non-aligned relationship with the side orifices of the distribution trough. At high vapor flow rates where there is a tendency for the upwardly rising vapor to divert the liquid coming from the bottom of the deflection or splash plate in a direction other than straight down to the drip points then the vapor holes should be larger than at lower vapor flow rates such as more than fifty percent (50%) of the area of the bottom or support plate.

In one embodiment, in the support or bottom plate, triangular-shaped first openings are employed which allow the liquid to run through and drip onto the packing below from the multiple drip points to the lower edge of the lower section of the deflection plate. Of course, if desired, the lower section may also have tongues extending therefrom to distribute the liquid and particularly tongues having points at the ends thereof to act as drip points. In addition, the lower plate section on one or both sides may be textured perforated or otherwise treated or embossed, such as, for example, with cross hatching with lines to encourage the spread of the liquid across the plate surface before the liquid drips from the multiple drip points onto the packing below. The liquid distributor of the invention also permits one or more levels of orifices, such as two levels of orifices, to be employed in the liquid distributor means, such as the lateral trough, without incurring any additional costs.

In operation, the liquid distributor provides for the entrance of the liquid from an inlet into the predistributing trough or meter box, and which liquid enters generally the center of a distribution trough, and as the liquid fills up in the trough, it flows through the orifices positioned on the sidewalls of the trough at the proper or desired rates. The liquid then flows outwardly to splash against the impingement or deflection baffles spaced apart on one or preferably both sides of the distributor means. The deflection plate permits the downward flow of the liquid onto the lower plate section where it spreads out and then drips from the multiple drip points or tongues onto the packing below so that there are multiple drip points for each orifice in the distributor means to provide efficient liquid distribution of the liquid to the packing below, while the support or bottom plate has large openings therein to permit the upward flow of vapor without disturbing the downward flow of the liquid.

The invention will be described for the purposes of illustration only in connection with certain embodiments. However, it is recognized that various changes, modifications, improvements and additions may be made by those persons skilled in the art, all falling within the spirit and scope of the invention as described and illustrated.

DESCRIPTION OF THE EMBODIMENTS

Figure 1:
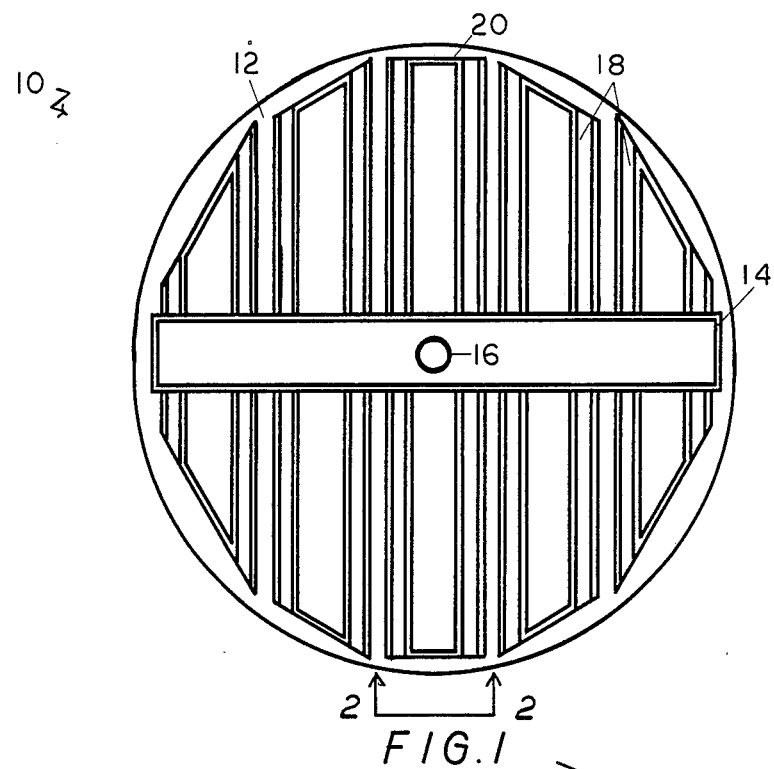
FIG. 1 is a schematic, illustrated top plan view of a gas-liquid contact column containing the liquid distributor of the invention.

FIG. 1 is a schematic, illustrated top plan view of a gas-liquid column 10 showing a plurality of generally parallelly arranged liquid distributor troughs 12 extending across the cross section of the column 10 with a predistributing means, such as a meter box 14, extending across generally perpendicular to the troughs 12 and with a liquid inlet 16 discharging a liquid into the meter box and subsequent discharge from the meter box into each of the individual distributor troughs 12 with the distributor troughs showing liquid deflection plates 18 generally parallelly arranged on each side of the distributor trough 12 and showing a support plate 20 extending from the distributor trough 12 and supporting the deflection plate 18. The gas-liquid column has a plurality of random or structured packings disposed beneath the distribution system. As illustrated, the liquid distribution system, that is, the liquid trough distributors 12, is supported within the column and level across the extent of the column.

Figure 2:
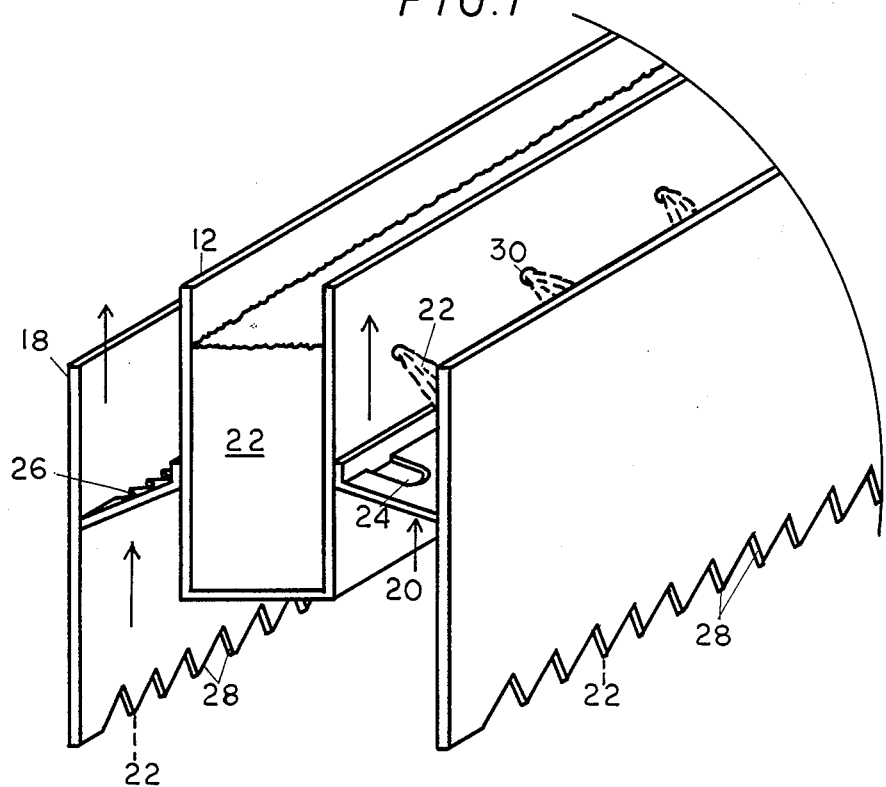
FIG. 2 is a perspective, schematic view from above of the liquid distributor of FIG. 1.
Figure 3:
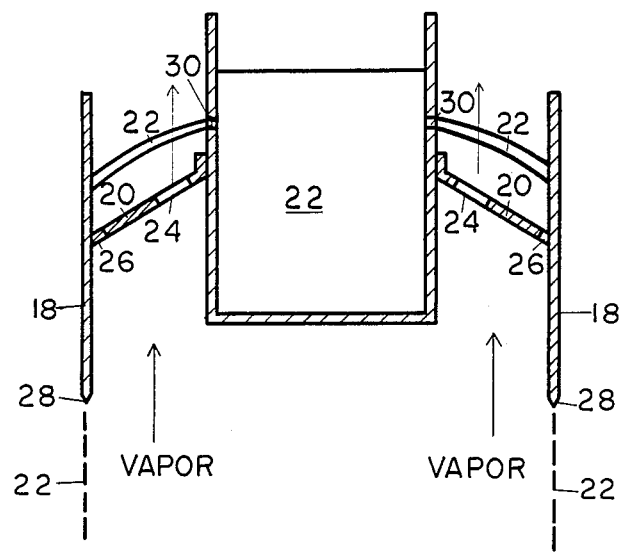
FIG. 3 is an enlarged cross sectional view along the lines of 2—2 of FIG. 1 of the liquid distributor of the invention.
Figure 4:
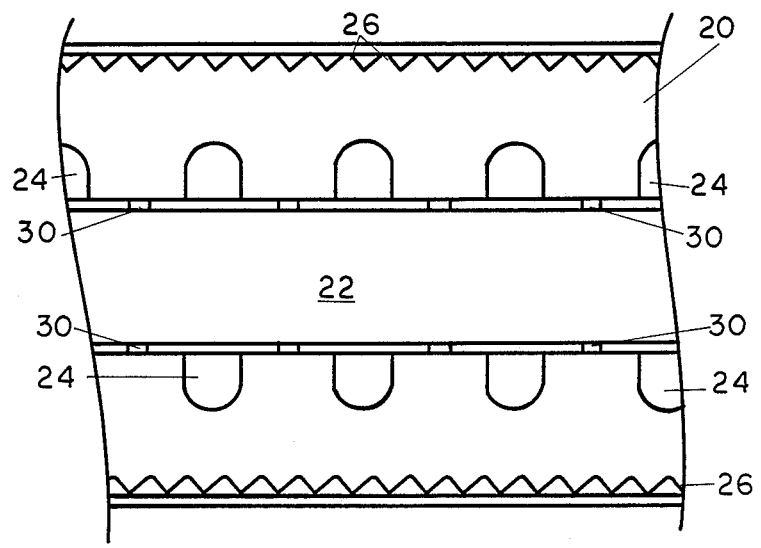
FIG. 4 is a large fragmentary top plan view of the liquid distributor as illustrated in FIG. 2.

FIG. 2 is a perspective view of the distributor, while FIGS. 3 and 4 are sectional view of the distributor. FIGS. 2, 3 and 4 show the liquid to be distributed in the gas-liquid column 22 in the distributor trough 12 and with the support or bottom plates 20 illustrated as at a generally outwardly inclined angle from the sides of the distributor trough 12 and containing therein a large vapor hole 24 to permit the upward passage of vapor and containing liquid holes 26 disposed adjacent where the support or bottom plate 20 connects the deflection plate 18 and dividing the deflection plate into an upper deflecting plate section and a lower distributing section with the lower distributing section having a plurality of drip points 28, which are a series of serrated points, extending along the lower bottom edge thereof and with the liquid trough 12 having a plurality of orifices 30 disposed on the sides thereon to permit discharge of liquid 22 from the trough 12 through the orifices 30 to splash upon the interior upper portion of the deflection plates 18, and thereafter, to run down and through the holes 28 and down on the inside of the lower portion of the plate 18 and to drip from the multiple point distributors 28 onto the packing below while permitting the unimpeded upward flow of vapor through the vapor holes 24. As illustrated, the bottom or support plate 20 is disposed at a slight angle to form a check mark in cross section; however, if desired, the support plate may be generally across to form a "T" shape section also.

FIG. 3 is an illustrated, fragmentary top plan view of the liquid distributor of FIG. 2 in which the vapor holes are illustrated as semicircular, large holes of much greater opening area 24 than the liquid distributor holes 26. As illustrated, the liquid distributor holes 26 are a plurality of small triangular holes so as to provide a number of holes, say four per inch of linear length, so that the liquid flowing through each orifice hole 30 has a plurality of holes in which to flow through so as to enable the liquid to be spread on the interior surface of the lower section of the deflection plate 18 below, and therefore, to be distributed onto the multiple distributing points 28. The shape, character and size of the vapor and liquid holes 24 and 26 are illustrative only and various shapes, designs and openings may be employed as desired, as well as in the liquid orifice hole, which may be a triangular hole or a slotted hole as employed in the prior art.

Figure 5:
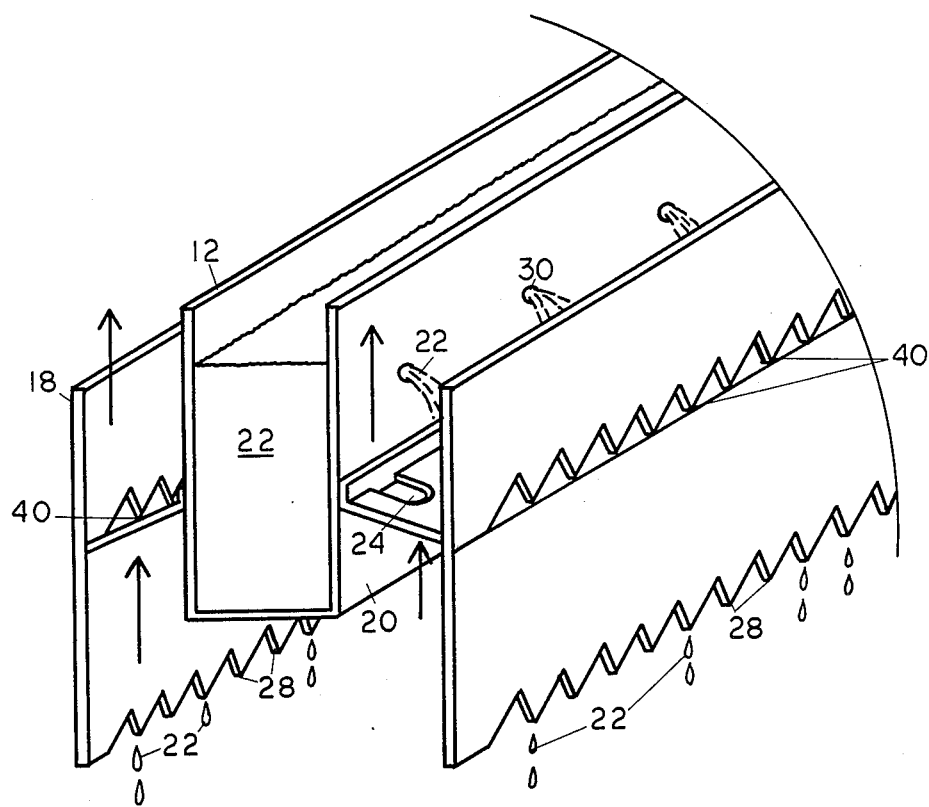
FIG. 5 is a perspective, schematic view from above of the liquid distributor of FIG. 1 with openings in the bottom section of the upper deflection plate rather than in the bottom plate as shown in FIG. 1.

FIG. 5 illustrates the embodiment of the distributor wheren a plurality of liquid distribution holes such as triangular shaped holes 40 are placed in the lower section of the upper section of plate 18 generally adjacent the intersection of the bottom plate 20 with the deflection plate 18 so as to enable the liquid to be spread on the exterior surface wall of the lower section of plate 18 to drip points 28.

The liquid distributor therefore provides a means for deflection or impingement of the liquid flowing from the primary distributor and to provide for the liquid to be distributed to the lower portion of a plate and then to be distributed from multiple drip points to the random packing below, and in effect, forming a secondary trough wherein the bottom or support plate contains large vapor holes to permit the upward passage of vapor and also permitting where the secondary trough is filled or has a liquid level to provide for equal flow of the vapor through the liquid level in the secondary trough. The liquid distributor of the invention provides for efficient and uniform distribution of the liquid onto the packing below, and also is so constructed as to be easily manufactured and easily maintained and cleaned in use.

What is claimed is:

1. A liquid distributor apparatus for use in a gas-liquid contact column to distribute uniformly a downwardly flowing liquid across the cross section area of the contact column and to permit passage of an upwardly flowing gas in the column, which apparatus comprises:
    (a) a liquid distributor means having a plurality of orifices therein to permit a downwardly flowing liquid in the distributor means to pass through said orifices at a defined liquid level;
    (b) a secondary trough means upon one or both sides of the liquid distributor means, the secondary distributor means comprising:
        (i) a deflection plate having an upper section and a lower section;
        (ii) a bottom support plate secured at one end to the deflection plate and at the other end to the distributor means and dividing the deflection plate into the said upper and lower sections;
        (iii) the upper plate section positioned to deflect a liquid from said orifices, splashing on the wall surface of said plate section;
        (iv) the support plate or upper section of said deflection plate characterized by a plurality of first openings generally adjacent the intersection of the deflection plate and the support plate to permit the downward flow of deflected liquid from said orifices on the lower section of the said deflection plate;

(v) a plurality of second openings in the bottom plate generally adjacent the other end of the support plate and of larger surface area than of the first openings to permit the upward flow of gas through said second openings in the support plate;

(vi) said lower plate section having a lower edge which extends below the distributor means; and (vii) the lower plate section having a multiple point distributor means at the lower edge thereof to permit the liquid collected from the deflecting plate and passing through the first openings and spread on the wall surface of the lower plate section to be generally uniformly distributed from said uniform distribution means to the next lower section of the gas-liquid contact tower.

2. The apparatus of claim 1 wherein the distributor means comprises a generally rectangular, open top trough.

3. The apparatus of claim 1 wherein the deflection plate is spaced apart and generally disposed parallel to the sidewall of the distributor means and wherein the support plate intersects the deflection plate at about a 90° or at an acute angle.

4. The apparatus of claim 1 wherein the upper section of the deflection plate means includes a plurality of openings in the deflection plate generally adjacent the intersection of the one end of the support plate to the deflection plate so as to permit liquid to flow out of said openings over the exterior wall surface of the lower plate section of the deflection plate.

5. The apparatus of claim 1 wherein the second openings in the support plates are positioned in a non-aligned manner with and between said orifices in the distributing means.

6. The apparatus of claim 1 wherein said first openings comprise a plurality of generally triangular openings extending generally uniformly along the length of the support plate and the intersection with the deflection plate means.

7. The apparatus of claim 1 wherein the multiple point distributor means comprises a plurality of serrated points on the lower edge of the lower section of the deflection plate.

8. A gas-liquid contact column which includes:
(a) a means to introduce a downwardly flowing liquid into the column
(b) a predistributor means to receive the liquid and to predistribute the liquid through a plurality of distributing means; and
(c) the liquid distributor of claim 1.

9. A liquid distributor apparatus for use in a gas-liquid contact column to distribute uniformly a downwardly flowing liquid across the cross section area of the contact tower to the lower levels and to permit the passage of an upwardly flowing gas, which apparatus comprises:
(a) a plurality of spaced apart, generally parallel liquid distributor means to distribute a liquid, the distributor means having sidewalls, the sidewalls containing a plurality of orifices therein, said orifices generally of defined size, spacing and position to permit the uniform distribution of a downwardly flowing liquid from the distributing means, to pass through said orifices at a defined liquid level in the distributor means; and (b) a secondary trough means on either side of the distributor means to distribute liquid from the liquid distributor means, said secondary trough means comprising a deflection plate spaced apart from and generally parallel to the longitudinal axis of the distributor means, said deflection plate having an upper section and a lower section, and which means comprises a support plate secured at the one end to said deflection plate and dividing the deflection plate into an upper and lower section, and secured at the other end to the distributor means; and (i) the wall surface of the upper plate section disposed to receive and deflect liquid issuing from said orifices of the distributing means;

(ii) the support plate or the lower portion of the upper section of the deflection plate, or both, characterized by a plurality of generally uniform first openings therein, said openings generally adjacent the intersection of the deflection plate and support plate, and which first openings permit the downward flow of deflected, liquid from said openings onto the interior or exterior wall surface of the lower plate section;

(iii) a plurality of second openings in the support plate, said second openings having a larger surface area than the first openings, and said second openings being generally adjacent the other end of the bottom plate and the distributor means, said second openings to permit the upward flow of vapor therethrough; and (iv) the lower plate section having a plurality of generally serrated drip points extending along the lower edge of the plate section whereby the surface of the lower plate section receives the downward flowing liquid from the first openings, and the liquid is spread over the lower plate wall surface and the serrated drip points to generally uniformly distribute the liquid from said drip points through the next lower section of the gas-liquid contact column.

10. A method of distributing a downwardly flowing liquid in a gas-liquid contact column generally uniformly across the cross sectional area of said column, and to permit the upward flow of vapor, which method comprises:
(a) introducing a liquid into a liquid distributor within a gas-liquid column;
(b) discharging the liquid from the liquid distributor at a defined level from orifices in the liquid distributor; and
(c) distributing the discharged liquid from the orifices from a plurality of distributing points to a lower portion of the column, the improvement which comprises:
(i) deflecting the discharged liquid issuing from said orifices by splashing the liquid against the wall surface of a deflection plate generally spaced apart from the orifices;
(ii) securing the deflection plate in a spaced apart position from the liquid distributor by a support plate and passing the gas upwardly through openings in the support plate;
(iii) flowing the splashed liquid from the deflection plate through a plurality of openings in either the deflection plate or the support plate which are adjacent the intersection of the plates to permit the liquid to flow downwardly over a wall surface of the deflection plate; and (iv) distributing the spread liquid on the lower portion of the deflection plate surface to the lower level of the deflection plate and from a plurality of distribution points on the lower edge of the deflection plate to the lower portion of the gas-liquid column.

11. The method of claim 10 which includes passing the gas upwardly through the support plate with the gas openings in the support plate not aligned with the orifices in the liquid distributor.

12. The method of claim 11 which includes employing a plurality of distributing points for each orifice from which liquid is discharged from the distributor.

* * * * *